(12) United States Patent
Shay

(10) Patent No.: US 7,591,001 B2
(45) Date of Patent: *Sep. 15, 2009

(54) SYSTEM, APPARATUSES, METHODS AND COMPUTER-READABLE MEDIA FOR DETERMINING THE SECURITY STATUS OF A COMPUTER BEFORE ESTABLISHING A NETWORK CONNECTION

(75) Inventor: A. David Shay, Lawrenceville, GA (US)

(73) Assignee: Liquidware Labs, Inc., Alpharetta, GA (US)

( * ) Notice: Subject to any disclaimer, the term of this patent is extended or adjusted under 35 U.S.C. 154(b) by 756 days.

This patent is subject to a terminal disclaimer.

(21) Appl. No.: 11/123,546

(22) Filed: May 5, 2005

(65) Prior Publication Data

US 2005/0257249 A1 Nov. 17, 2005

Related U.S. Application Data

(60) Provisional application No. 60/571,360, filed on May 14, 2004.

(51) Int. Cl.
*H04L 9/00* (2006.01)
*H04L 9/32* (2006.01)

(52) U.S. Cl. .................................. 726/1; 726/2; 726/3

(58) Field of Classification Search ................. 726/1–4, 726/11–15, 22–25; 713/150–154; 709/223–225, 709/229

See application file for complete search history.

(56) References Cited

U.S. PATENT DOCUMENTS

| | | | |
|---|---|---|---|
| 5,204,961 A | 4/1993 | Barlow | |
| 5,216,675 A | 6/1993 | Melliar-Smith et al. | |
| 5,689,566 A | 11/1997 | Nguyen | |
| 5,796,942 A | 8/1998 | Esbensen | |
| 5,802,178 A | 9/1998 | Holden et al. | |
| 5,872,847 A | 2/1999 | Boyle et al. | |
| 5,956,481 A | 9/1999 | Walsh et al. | |
| 6,070,244 A | 5/2000 | Orchier et al. | |

(Continued)

FOREIGN PATENT DOCUMENTS

CA 2286534 4/2001

(Continued)

OTHER PUBLICATIONS

International Search Report Dated Apr. 29, 2004, from Corresponding International Application No. PCT/US/03/36713, Filed Nov. 17, 2003.

(Continued)

*Primary Examiner*—Hosuk Song
(74) *Attorney, Agent, or Firm*—Morris Manning & Martin LLP

(57) ABSTRACT

The disclosed system, apparatuses, methods, and computer-readable media can be used by a computer to establish the security status of another computer before establishing a network connection to it. Responsive to a request message, security state data indicating this status can be incorporated into a response message as one of the first few packets exchanged by computers to establish a network connection. This enables a computer to determine whether the other computer's security status is compliant with its security policy before establishing the network connection, reducing risk of infection by a virus, worm, or the like.

16 Claims, 9 Drawing Sheets

U.S. PATENT DOCUMENTS

| | | | |
|---|---|---|---|
| 6,119,171 | A | 9/2000 | Alkhatib |
| 6,219,786 | B1 | 4/2001 | Cunningham et al. |
| 6,219,787 | B1 | 4/2001 | Brewer |
| 6,275,942 | B1 | 8/2001 | Bernhard et al. |
| 6,279,113 | B1 | 8/2001 | Vaidya |
| 6,317,831 | B1 | 11/2001 | King |
| 6,320,874 | B1 | 11/2001 | Crump et al. |
| 6,363,489 | B1 | 3/2002 | Comay et al. |
| 6,370,648 | B1 | 4/2002 | Diep |
| 6,408,391 | B1 | 6/2002 | Huff et al. |
| 6,493,342 | B1 | 12/2002 | Breslow et al. |
| 6,606,706 | B1 | 8/2003 | Li |
| 6,618,359 | B1 | 9/2003 | Chen et al. |
| 6,671,273 | B1 | 12/2003 | Beck |
| 6,742,118 | B1 | 5/2004 | Doi et al. |
| 6,772,334 | B1 | 8/2004 | Glawitsch |
| 6,959,184 | B1 | 10/2005 | Byers et al. |
| 6,980,658 | B1 | 12/2005 | Rezaiifar et al. |
| 6,985,941 | B2 | 1/2006 | Schweitzer et al. |
| 7,007,301 | B2 | 2/2006 | Crosbie et al. |
| 7,134,022 | B2 | 11/2006 | Flyntz |
| 7,280,540 | B2 * | 10/2007 | Halme et al. ............ 370/392 |
| 7,302,700 | B2 | 11/2007 | Mao et al. |
| 7,334,254 | B1 | 2/2008 | Boydstun, et al |
| 2001/0023482 | A1 | 9/2001 | Wray |
| 2001/0054159 | A1 | 12/2001 | Hoshino |
| 2002/0004847 | A1 | 1/2002 | Tanno |
| 2002/0029337 | A1 | 3/2002 | Sudia et al. |
| 2002/0078202 | A1 | 6/2002 | Ando et al. |
| 2002/0078354 | A1 | 6/2002 | Sandhu et al. |
| 2002/0083343 | A1 | 6/2002 | Crosbie et al. |
| 2002/0087882 | A1 | 7/2002 | Schneier et al. |
| 2002/0101332 | A1 | 8/2002 | Talmadge et al. |
| 2002/0103916 | A1 | 8/2002 | Chen et al. |
| 2002/0107953 | A1 | 8/2002 | Ontiveros et al. |
| 2002/0112185 | A1 | 8/2002 | Hodges |
| 2002/0129264 | A1 | 9/2002 | Rowland et al. |
| 2002/0133586 | A1 | 9/2002 | Shanklin et al. |
| 2002/0133698 | A1 | 9/2002 | Wank |
| 2002/0133721 | A1 | 9/2002 | Adjaoute |
| 2002/0136407 | A1 | 9/2002 | Denning et al. |
| 2003/0055994 | A1 | 3/2003 | Herrmann et al. |
| 2003/0074567 | A1 | 4/2003 | Charbonneau |
| 2003/0076794 | A1 | 4/2003 | Kawasaki et al. |
| 2003/0084331 | A1 | 5/2003 | Dixon et al. |
| 2003/0088791 | A1 | 5/2003 | Porras et al. |
| 2004/0034771 | A1 | 2/2004 | Edgett et al. |
| 2004/0083286 | A1 | 4/2004 | Holden et al. |
| 2004/0107360 | A1 * | 6/2004 | Herrmann et al. ............ 713/201 |
| 2004/0215771 | A1 | 10/2004 | Hayes |
| 2004/0233915 | A1 | 11/2004 | Lin |

FOREIGN PATENT DOCUMENTS

| | | | |
|---|---|---|---|
| WO | WO 02/061510 | | 8/2002 |

OTHER PUBLICATIONS

Adolfo Rodriguez, John Gatrell, John Karas, Roland Peschke, "TCP/IP Tutorial And Technical Overview," Online, Aug. 2001, IBM Internet XP002276976, retrieved from the Internet, URL: www.IBM.Com/Readbooks, retrieved on May 21, 2003, p. I-Page XVIII, p. 665-p. 780.

Hunt, R., "Internet/Intranet FirewallSecurity-Policy, Architecture And Transaction Services," Computer Communications, Butterworths & Co. Publishers Ltd., GB, vol. 21, No. 13, Sep. 1, 1998, pp. 1107-1123, XP004146571 ISSN: 0140-3664, p. 111, right-hand column, p. 1113, right-hand column, figures 2-4.

Phifer, "Cost-Effective Remote End Point Protection: Against Trojans, Spyware, and Other Pests," PestPatrol White Paper, Sep. 1, 2002, pp. 1-11.

Sungard, "Welcome to the Info Security Performance Model," SunGard Assessment Tool, Sep. 1, 2002, pp. 1-2.

Westbridge, "XML Web Services Security-Going Production," Westbridge White Paper, Sep. 1, 2002, pp. 1-7.

Internet Security, "Complete Desktop Protection for The Enterprise," ISS Technical White Paper, Sep. 1, 2002, pages Cover, 1-6.

Internet Security, "Web Application Protection: Using Existing Protection Solutions," ISS Technical White Paper, Jul. 1, 2002, pgs. Cover 1-6.

Top Layer, "Preventing Cyber Attacks and Costly Network Degradation," Top Layer Webcast, May 30, 2002, pp. 1-13 (slides), pp. 1-15 (transcript).

Okena, "A Primer on Preventing Attacks at the Host—Okena, Inc.—Hurwitz Report," Hurwitz Analyst White Paper, Feb. 1, 2002, pp. 1-11.

Blue Lance, "Protecting Computer-Managed Assets: Building a Secure Infrastructure for Business," Larstan Business Reports, Jan. 1, 2002, pp. 1-10.

Okena, "Technology Best Practices for Intrusion Prevention," Okena Analyst White Paper, Jan. 1, 2002, pp. 1-3.

Computel, "Distributed Denial of Service Attacks," Network Security White Papers, Dec. 6, 2000, pp. 1-6.

Leithauser, "Fire Guardian," KnolwdgeStorm Solution Detail Report, 2002, pp. 1-2.

Kobelt, "NetSentron," KnowledgeStorm Solution Detail Report, 202, pp.1-3.

Internet Security, "RealSecure® SiteProtector for Enterprise Protection," KnowldgeStorm Solution Detail Report, 2002, pp. 1-5.

Internet Security, "BlackICE PC Protection," KnowledgeStorm Solution Detail Report, 2002, pp. 1-5.

Internet Security, "System Scanner®," KnowledgeStorm Solution Detail Report, 2002, pp. 1-5.

Internet Security, "Internet Scanner™," KnowledgeStorm Solution Detail Report, 2002, pp. 1-6.

Dynamics, "Webinspect™ (Web Application Security Assessment)," KnowledgeStorm Solution Detail Report, 2002, pp. 1-5.

Lockstep, Webagain—Automatic Web Site Repair, KnowledgeStorm Solution Detail Report, 2002, pp. 1-4.

Barham, et als., "Techniques for Lightweight Concealment and Authentication in IP Networks." Intel Research Berkley, Jul. 2002, pp. 1-12, IRB-TR-02-009, Intel Corp., U.S.A.

* cited by examiner

SYSTEM, APPARATUSES, METHODS AND COMPUTER-READABLE MEDIA FOR DETERMINING THE SECURITY STATUS OF A COMPUTER BEFORE ESTABLISHING A NETWORK CONNECTION

CROSS-REFERENCE TO RELATED APPLICATIONS

This patent application is a U.S. nonprovisional application filed pursuant to Title 35, United States Code §§100 et seq. and 37 C.F.R. Section 1.53(b) claiming priority under Title 35, United States Code §119(e) to U.S. provisional application No. 60/571,360 filed May 14, 2004 naming A David Shay as the inventor, which application is incorporated herein by reference. Both the subject application and its provisional application have been or are under obligation to be assigned to the same entity.

BACKGROUND OF THE INVENTION

1. Field of the Invention

This invention relates to security in network communications, and more particularly, to a system, apparatuses, methods, and computer-readable media that can be used to determine the security status of one or more computers in order to evaluate if a network connection of such computers would pose an impermissible security risk.

2. Description of the Related Art

In network communications, users desire to operate their computers to freely access websites and other resources over the Internet. However, security risks posed by accessing unknown computers and websites can be substantial. Once computers establish a network connection, either computer can infect the other with a virus or worm, for example. This can crash the computers, cause them to lose data, and/or cause them to infect other computers with the virus or worm via the Internet. The costs of virus and worm outbreaks are well-known and documented. For example, the economic damage done to computer users by the Goner, Code Red II, Blaster, SoBig, Netsky and Sasser worms and viruses was significant. In each outbreak, the impact worldwide easily amounted to millions or billions of US dollars in damage to lost productivity and costs to resolve the consequences of these worms and viruses. Clearly, it would be desirable to provide an invention with the capability to check the security status or vulnerability of computers before establishing a network connection in order to avoid infection of the computers with attendant adverse consequences.

SUMMARY OF THE INVENTION

The disclosed system, apparatuses, methods, and computer-readable media, in their various embodiments, overcome one or more of the above-mentioned problems, and achieve additional advantages as hereinafter set forth.

At a general level, a first computer attempting to establish a network connection with a second computer requests and receives data indicating the second computer's security status. Such data indicating a computer's security status is termed 'security state data' herein, and can indicate one or more security status factors such as whether the second computer is executing an anti-virus application, whether the anti-virus application is up-to-date, whether the second computer is running a firewall application, whether the firewall application is up-to-date, whether the second computer is running an operating system patch(es) for closing a vulnerability, and/or whether the operating system patch(es) is up-to-date. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The first computer receives and determines from data indicating its security policy whether a network connection to the second computer is permitted. Through exchange of security state data from one computer to another and determination as to whether the security state data complies with a computer's security policy, the possibility of transmission of a virus or worm through a network connection can be greatly reduced or eliminated. Moreover, the security state data can be incorporated into the header of a packet used to establish a network connection, such as one of the packets used in a TCP SYN-SYNACK-ACK packet exchange. This permits no network connection to be established until a computer receives the other computer's security state data and determines whether it is compliant with the computer's security policy data. Accordingly, any virus or worm present on the other computer caused by not having its security measures (e.g., anti-virus application, firewall application, operating system patch, etc.) active and up-to-date is prevented from infecting the computer.

A method according to one embodiment of the invention comprises the steps of receiving from a first computer at a second computer via a network a request message from the first computer to establish a network connection; retrieving security state data at the second computer; incorporating the security state data into a response message; and transmitting the response message including the security state data from the second computer to the first computer via the network. The security state data can be generated by one or more of an anti-virus application, a firewall application, and an operating system running on the second computer. Alternatively, or in addition to the above options, the security state data can comprise data received via the Internet from a developer's website to indicate that an update to one or more of an anti-virus application, firewall application, and operating system are available for download. For example, the security state data can indicate whether an anti-virus application is running on the first computer, whether the anti-virus application is up-to-date, whether-a firewall application is running on the first computer, whether the firewall application is up-to-date, whether an operating system patch(es) has been installed to close a vulnerability in the operating system running on the first computer, and/or whether the operating system patch(es) is up-to-date. The security state data can be incorporated in the header of the response message. For example, the response message can be a TCP SYNACK packet, and the security state data can be incorporated in a field, such as the urgent pointer field, in the header of the TCP SYNACK packet. The network can be the Internet for which TCP is a standard protocol. The method can further comprise the steps of receiving the response message including the security state data from the second computer at the first computer via the network; determining at the first computer whether the network connection to the second computer is permitted based on security policy data stored in the first computer and the security state data received from the second computer; proceeding with establishing the network connection if the determining establishes that the network connection to the second computer is permitted; and terminating further processing to establish the network connection if the first computer determines that the network connection to the second computer is not permitted. The method can further comprise the steps of receiving the response message including the security state data from the second computer at the first computer via the network; and determining at the first computer whether security activation data stored at the first computer indicates that the security state data is to be processed in order to determine whether network connection to the second computer is to be permitted. If the determining establishes that the security activation data indicates that the security state data is to be processed, the method can further comprise determining at the first computer if the network connection to the second computer is permitted based on security policy data stored in the first computer and the security state data received from the second computer; proceeding with establishing the network connection if the determining establishes that connection to the second computer is permitted; and terminating further processing to establish the network connection if the determining establishes that the connection to the second computer is not permitted. The security activation data thus enables the security measures of the present invention to be selectively activated, which may be advantageous in certain contexts-such as testing of computers, etc.

A method in accordance with another embodiment of the invention comprises the steps of transmitting a request message for establishing a network connection from a first computer to a second computer via a network; receiving a response message including security state data of the second computer at the first computer from the second computer via the network; determining at the first computer if the connection to the first computer is permitted based on security policy data stored at the first computer and the security state data received from the second computer; proceeding with establishing the network connection if the determining establishes that the network connection to the second computer is permitted; and terminating further processing to establish the network connection if the determining establishes that the network connection to the second computer is not to be permitted. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The security state data can comprise data indicating whether an anti-virus application is running on the first computer, data indicating whether the anti-virus application is up-to-date, data indicating whether a firewall application is running on the first computer, data indicating whether the firewall application is up-to-date, data indicating whether an operating system patch (es) has been installed to close a vulnerability in the operating system running on the first computer, and/or data indicating whether the operating system patch(es) is up-to-date. The request message can be a TCP SYN packet, and the response message can be a TCP SYNACK packet. The security state data can be received by the first computer from a field of the header of the SYNACK packet. The field can be the urgent pointer field. The proceeding with establishing the network connection can be performed at the first computer by generating and transmitting an ACK packet to the second computer in response to the SYNACK packet. The terminating of establishing the network connection can be performed by the first computer disregarding the SYNACK packet. Alternatively, the terminating of establishing the network connection can be performed by generating and transmitting a NACK packet from the first computer to the second computer via the network. The network can be the Internet for which TCP is a standard protocol.

A computer-readable medium according to one embodiment of the invention stores computer code for use in relation to a first computer communicating with a second computer to determine if a network connection to the second computer is permitted. The second computer executes the computer code to perform the following steps: receiving from the first computer at the second computer via the network a request message from the first computer to establish the network connection; retrieving security state data indicating the security status of the second computer at the second computer; incorporating the security state data into a response message at the second computer; and transmitting the response message including the security state data from the second computer to the first computer via the network. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The security state data can comprise data indicating whether an anti-virus application is running on the first computer, whether the anti-virus application is up-to-date, whether a firewall application is running on the first computer, whether the firewall application is up-to-date, whether an operating system patch has been installed to close a vulnerability in the operating system running on the second computer, and/or whether the operating system patch is up-to-date. The security state data can be incorporated in the header of the response message. The response message can be a TCP SYN-ACK packet, and the security state data can be incorporated in a field in the header of the TCP SYNACK packet, such as the urgent pointer field. The network can be the Internet for which TCP is a standard protocol. The first computer can execute the computer code stored in the computer-readable medium to perform the following further steps: receiving the response message including the security state data from the second computer at the first computer via the network; determining at the first computer if the network connection to the second computer is permitted based on security policy data stored in the first computer and the security state data received from the second computer; proceeding with establishing the network connection if the determining establishes that the network connection to the second computer is permitted; and terminating further processing to establish the network connection if the first computer determines that the network connection to the second computer is not permitted. Alternatively, the second computer can execute the computer code stored in the computer-readable medium to perform the following farther steps: receiving the response message including the security state data from the second computer at the first computer via the network; determining at the first computer if security activation data stored at the first computer indicates that the security state data is to be processed in order to determine if network connection to the second computer is to be permitted; and if the determining establishes that the security activation data indicates that the security state data is to be processed, determining at the first computer if the network connection to the second computer is permitted based on security policy data stored in the first computer and the security state data received from the second computer; proceeding with establishing the network connection if the determining establishes that connection to the second computer is permitted; and terminating further processing to establish the network connection if the determining establishes that the connection to the second computer is not permitted.

A computer-readable medium in accordance with an embodiment of the invention stores computer code executable by a first computer communicating with a second computer via a network. The first computer executes the computer code to perform the following steps: transmitting a request message for establishing a network connection from a first computer to a second computer via a network; receiving a response message including security state data indicating the security status of the second computer at the first computer via the network; determining at the first computer if the connection to the second computer is permitted based on security policy data stored at the first computer and the security state data received from the second computer; proceeding with establishing the network connection if the determining establishes that the network connection to the second computer is permitted; and terminating further processing to establish the network connection if the determining establishes that the network connection to the second computer is not permitted. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The security state data can comprise data indicating whether an anti-virus application is running on the first computer, data indicating whether the anti-virus application is up-to-date, data indicating whether a firewall application is running on the first computer, data indicating if the firewall application is up-to-date, data indicating whether an operating system patch(es) has been installed to close a vulnerability in the operating system running on the first computer, and/or data indicating whether the operating system patch is up-to-date. The request message can be a TCP SYN packet. The response message can be a TCP SYNACK packet, and the security state data can be received by the first computer from a field of the header of the SYNACK packet. The field can be the urgent pointer field. The proceeding with establishing the network connection can be performed at the first computer by generating and transmitting a TCP ACK packet to the second computer in response to the SYNACK packet. The terminating of establishing the network connection can be performed by the first computer disregarding the SYNACK packet. Alternatively, the terminating of establishing the network connection can be performed by generating and transmitting a NACK packet from the first computer to the second computer via the network. The network can be the Internet for which the TCP protocol is standard.

A system according to an embodiment of the invention uses a network for communication, and comprises a first computer and a second computer that are connected to the network. The first computer transmits a request message for establishing a network connection from the first computer to the second computer via the network. The second computer receives the request message from the first computer via the network, retrieves security state data indicating the security status of the second computer, incorporates the security state data into a response message, and transmits the request message including the security state data from the second computer to the first computer via the network. The first computer receives a response message including security state data from the second computer via the network, determines at the first computer if the connection to the second computer is permitted based on security policy data stored at the first computer and the security state data received from the second computer. The first computer proceeds with establishing the network connection if the determining establishes that the network connection to the second computer is permitted, and terminates further processing to establish the network connection if the determining establishes that the network connection to the second computer is not permitted. The security state data can be generated by one or more of an anti-virus application, a firewall application, and an operating system running on the second computer. Alternatively, or in addition to the above options, the security state data can comprise data received via the Internet from a developer's website to indicate that an update to one or more of an anti-virus application, firewall application, and operating system are available for download. The security state data can comprise data indicating whether an anti-virus application is running on the second computer, whether the anti-virus application is up-to-date, whether a firewall application is running on the second computer, whether the firewall application is up-to-date, whether an operating system patch(es) has been installed to close a vulnerability in the operating system running on the second computer, and/or whether the operating system patch(es) is up-to-date. The security state data can be incorporated in the header of the response message. The response message can be a TCP SYNACK packet, and the security state data can be incorporated in a field in a header of the TCP SYNACK packet. The field can be the urgent pointer field. The first computer can receive the response message including the security state data from the second computer via the network, determine at the first computer if the network connection to the second computer is permitted based on security policy data stored in the first computer and the security state data received from the second computer, proceed with establishing the network connection if the determining establishes that the network connection to the second computer is permitted, and terminate further processing to establish the network connection if the first computer determines that the network connection to the second computer is not permitted. Alternatively, the first computer can receive the response message including the security state data from the second computer via the network, determine at the first computer if security activation data stored at the first computer indicates that the security state data is to be processed in order to determine if network connection to the second computer is permitted, and if the determining establishes that the security activation data indicates that the security state data is to be processed, the first computer determines if the network connection to the second computer is permitted based on security policy data stored in the first computer and the security state data received from the second computer, proceeds with establishing the network connection if the determining establishes that connection to the second computer is permitted, and terminates further processing to establish the network connection if the determining establishes that the connection to the second computer is not permitted.

An apparatus using a network for communication, comprises a first computer connected to the network. The first computer transmits a request message for establishing a network connection from the first computer to the second computer via the network, receives a response message including security state data of the second computer from the second computer via the network, determines at the first computer if the connection to the second computer is permitted based on security policy data stored at the first computer and the security state data received from the second computer, proceeds with establishing the network connection if the determining establishes that the network connection to the second computer is permitted, and terminates further processing to establish the network connection if the determining establishes that the network connection to the second computer is not permitted. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The security state data can comprise data indicating whether anti-virus application is running on the second computer, data indicating whether the anti-virus application is up-to-date, data indicating whether a firewall application is running on the second computer, data indicating whether the firewall application is up-to-date, data indicating whether an operating system patch (es) has been installed to close a vulnerability in the operating system running on the second computer, and/or data indicating whether the operating system patch is up-to-date. The security state data can be incorporated in the header of the response message, and the response message can be a TCP SYNACK packet. The security state data can be incorporated in a field in a header of the TCP SYNACK packet, and the field can be the urgent pointer field. The first computer can receive the response message including the security state data from the second computer the network, determine if the network connection to the second computer is permitted based on security policy data stored in the first computer and the security state data received from the second computer, proceed with establishing the network connection if the determining establishes that the network connection to the second computer is permitted, and terminate further processing to establish the network connection if the first computer determines that the network connection to the second computer is not permitted. Alternatively, the first computer can receive the response message including the security state data from the second computer via the network, determine if security activation data stored at the first computer indicates that the security state data is to be processed in order to determine if network connection to the second computer is to be permitted, and if the determining establishes that the security activation data indicates that the security state data is to be processed, the first computer determines if the network connection to the second computer is permitted based on security policy data stored in the first computer and the security state data received from the second computer, proceeds with establishing the network connection if the determining establishes that connection to the second computer is permitted, and terminates further processing to establish the network connection if the determining establishes that the connection to the second computer is not permitted.

An apparatus according to the invention communicates via a network with a first computer. The apparatus comprises a second computer receiving from the first computer via the network a request message to establish a network connection, retrieving security state data at the second computer, incorporating the security state data into a response message, and transmitting the response message including the security state data from the second computer to the first computer via the network. The security state data can be generated by one or more of an anti-virus application, a firewall application, and an operating system running on the second computer. Alternatively, or in addition to the above options, the security state data can comprise data received via the Internet from a developer's website to indicate that an update is available for download for one or more of an anti-virus application, firewall application, and operating system. The security state data can indicate whether an anti-virus application is running on the second computer, whether the anti-virus application is up-to-date, whether a firewall application is running on the second computer, whether the firewall application is up-to-date, whether an operating system patch has been installed to close a vulnerability in the operating system running on the first computer, and/or whether the operating system patch is up-to-date. The security state data can be incorporated in the header of the response message. The response message can be a TCP SYNACK packet. The security state data can be incorporated in a field in the header of the TCP SYNACK packet. The header field can be the urgent pointer field. The network can be the Internet for which TCP is a standard protocol.

BRIEF DESCRIPTION OF THE DRAWINGS

Figure 1:
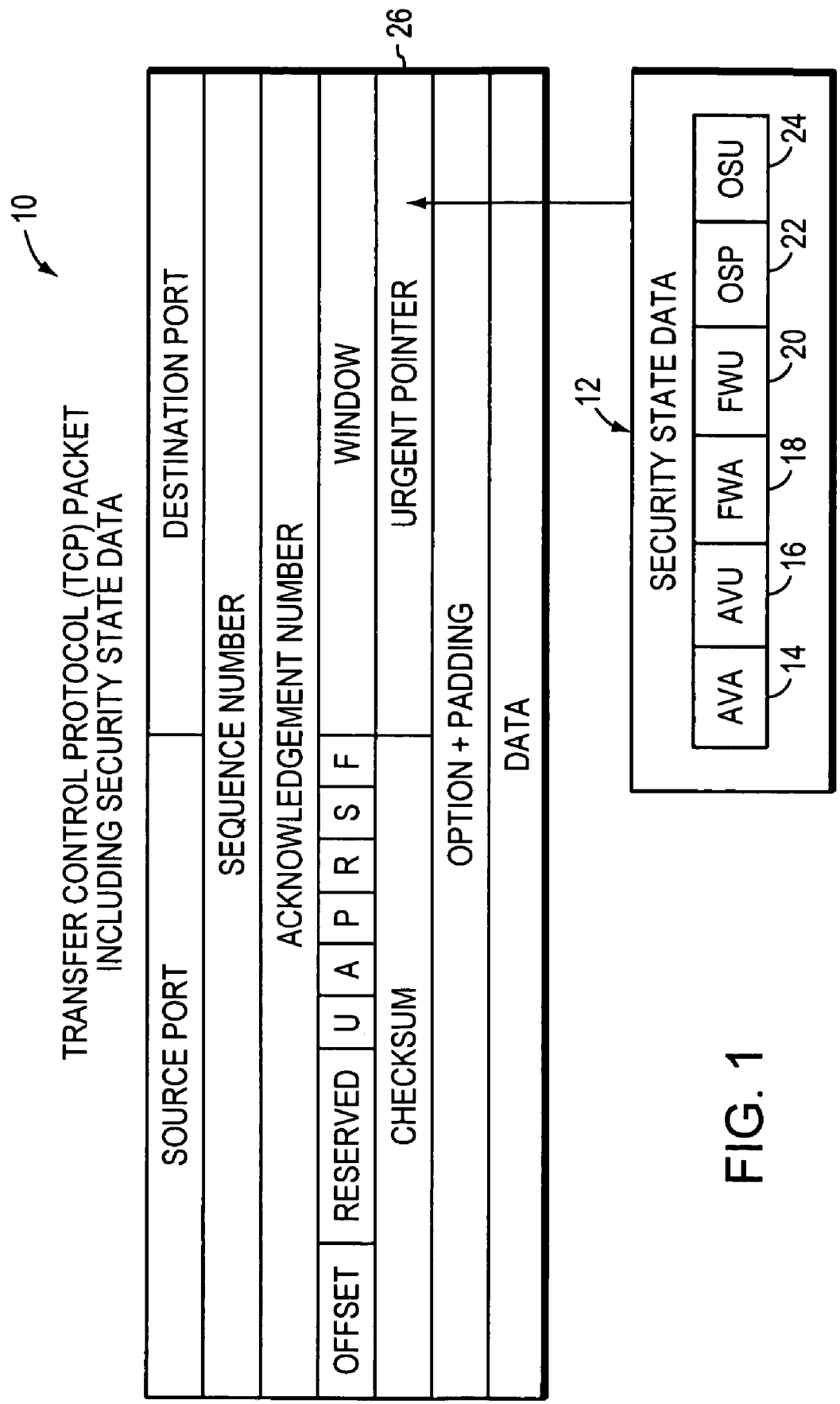
Figure 2:
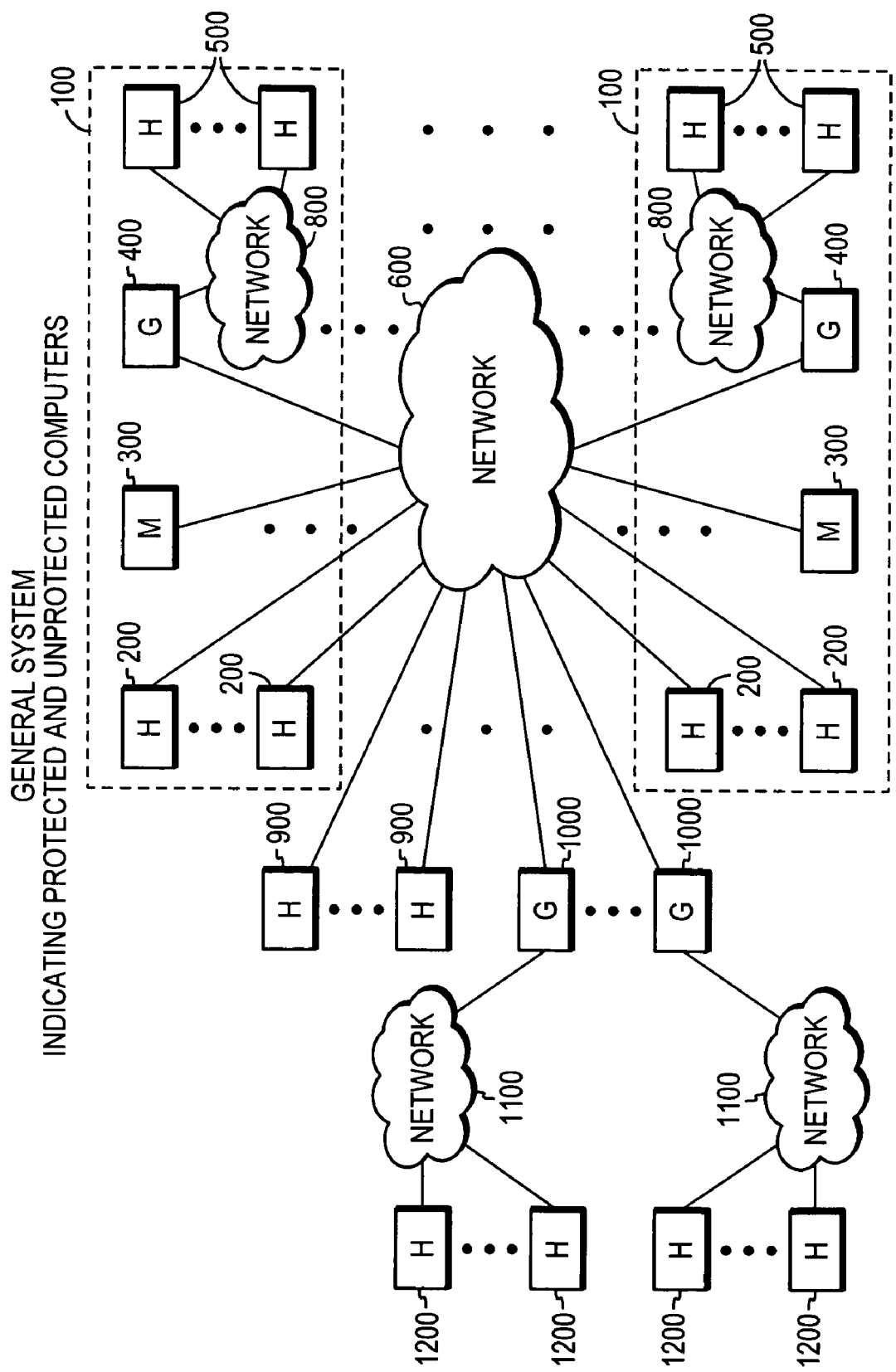
Figure 3A:
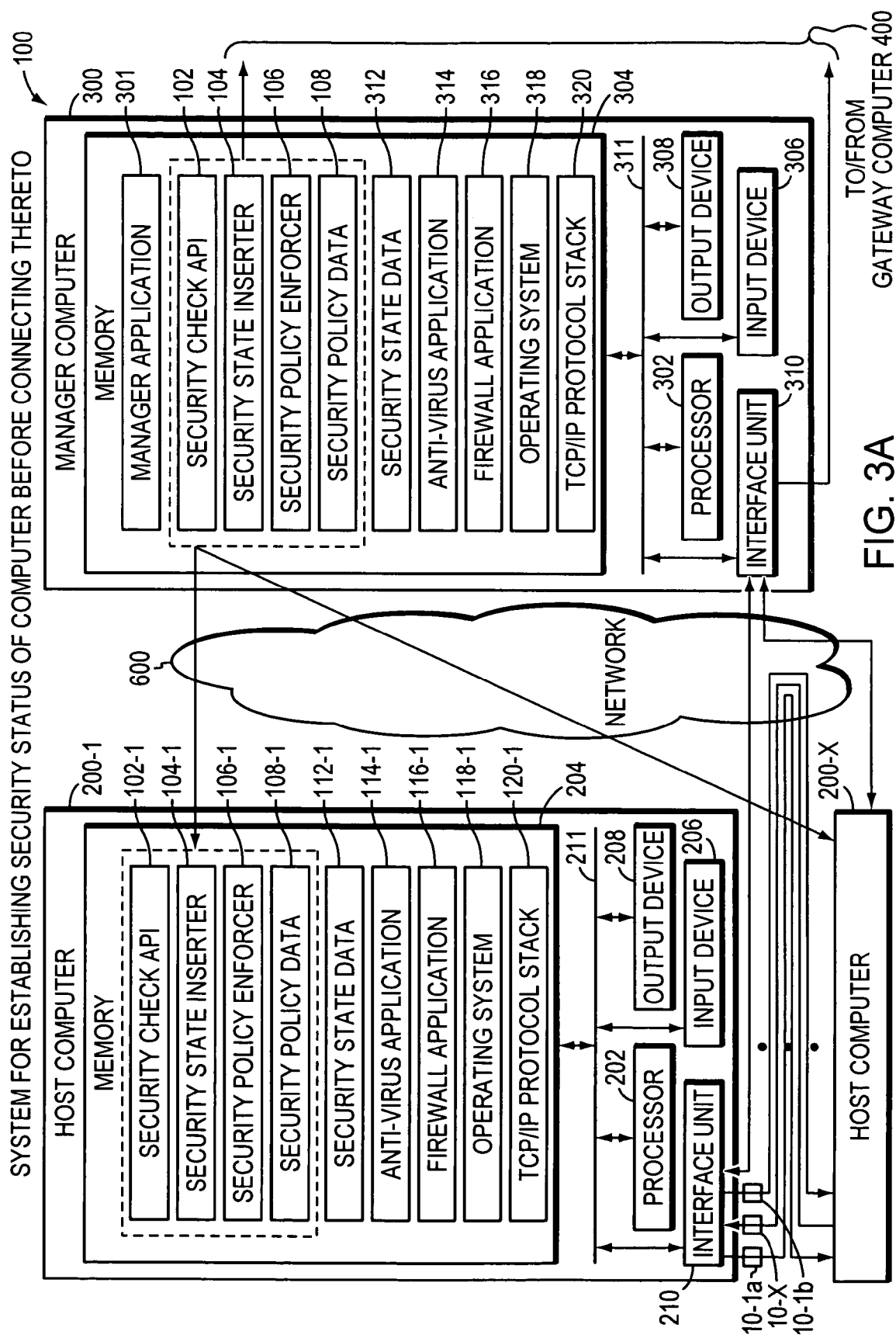
Figure 3B:
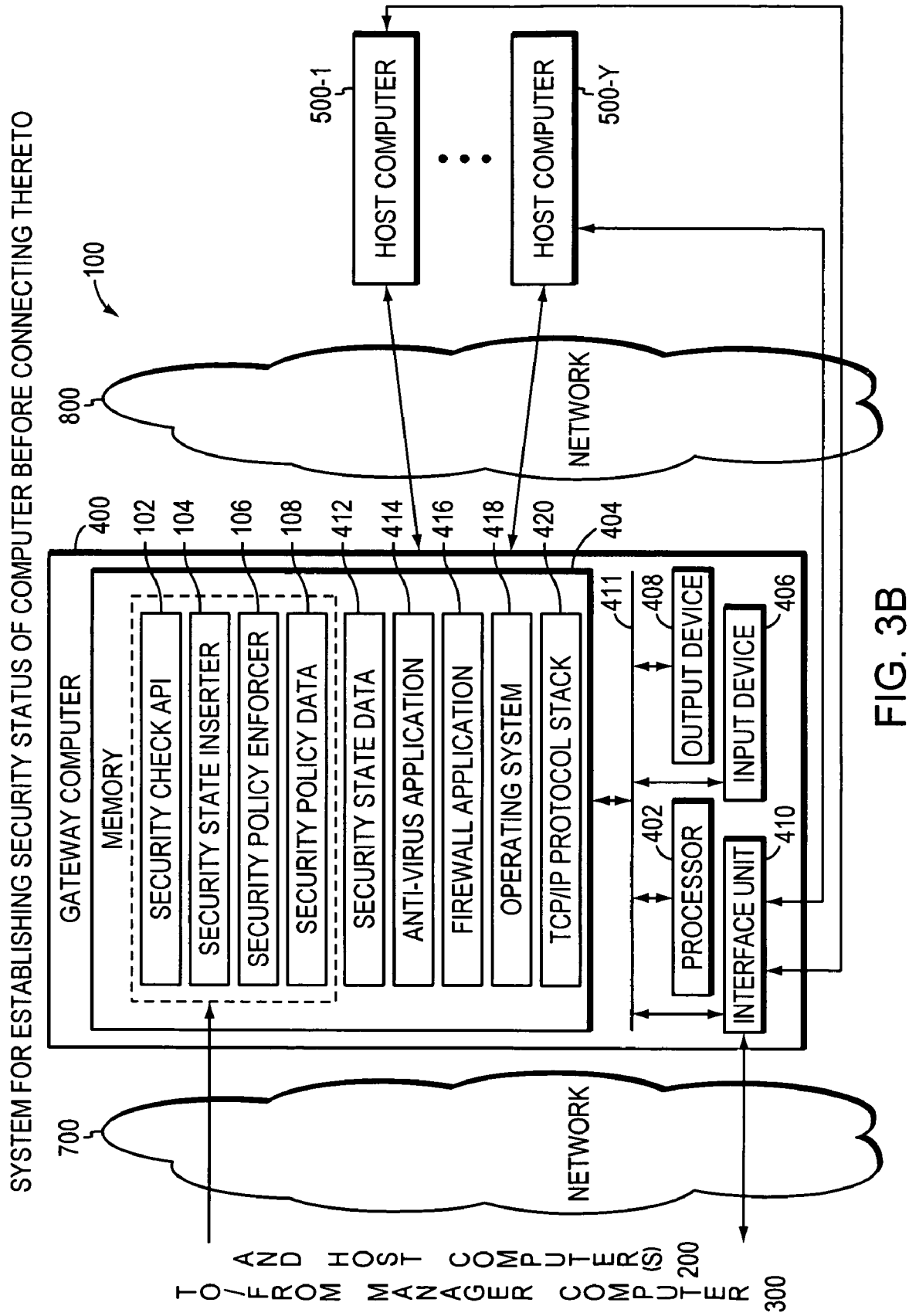
Figure 4:
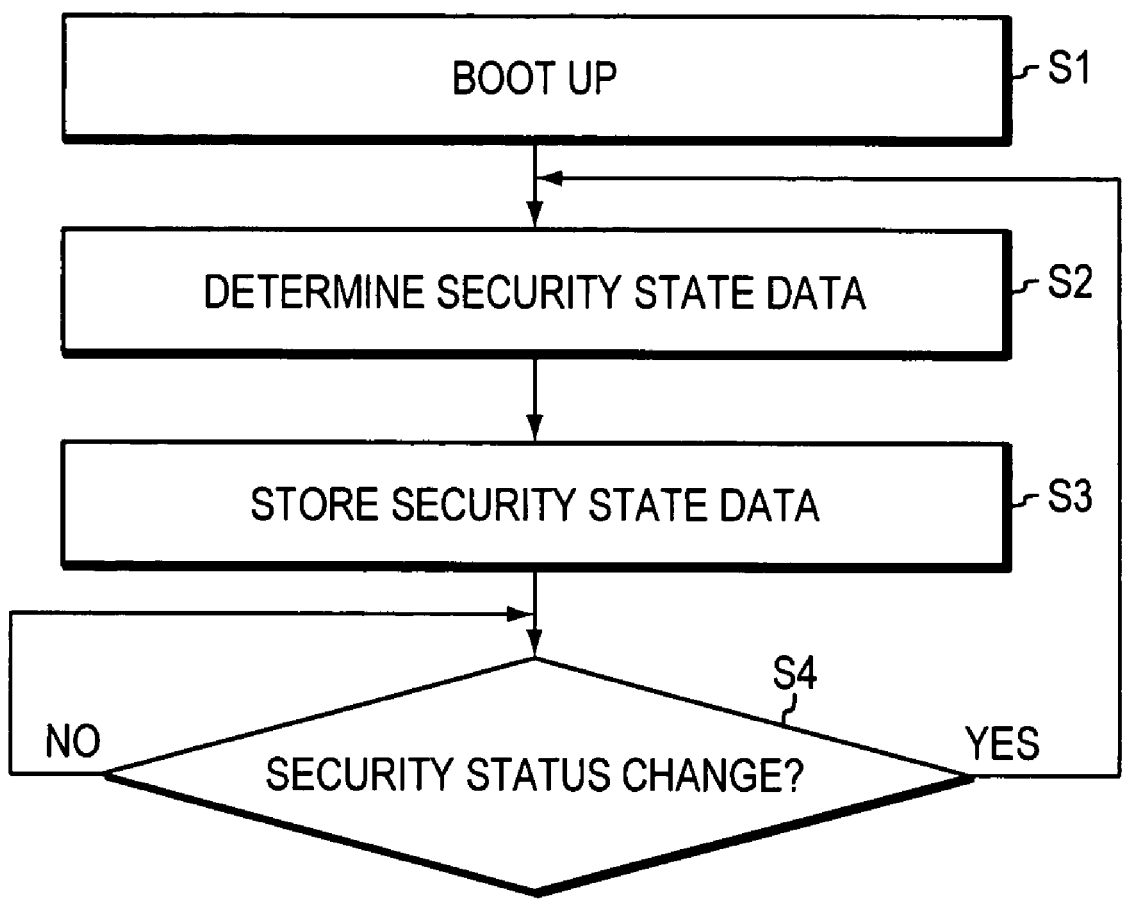
Figure 5:
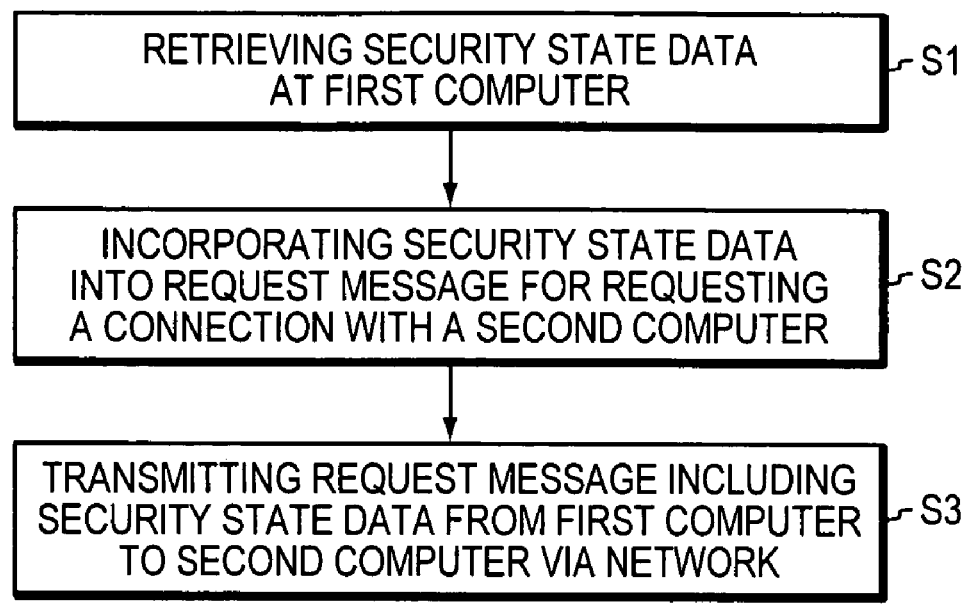
Figure 6:
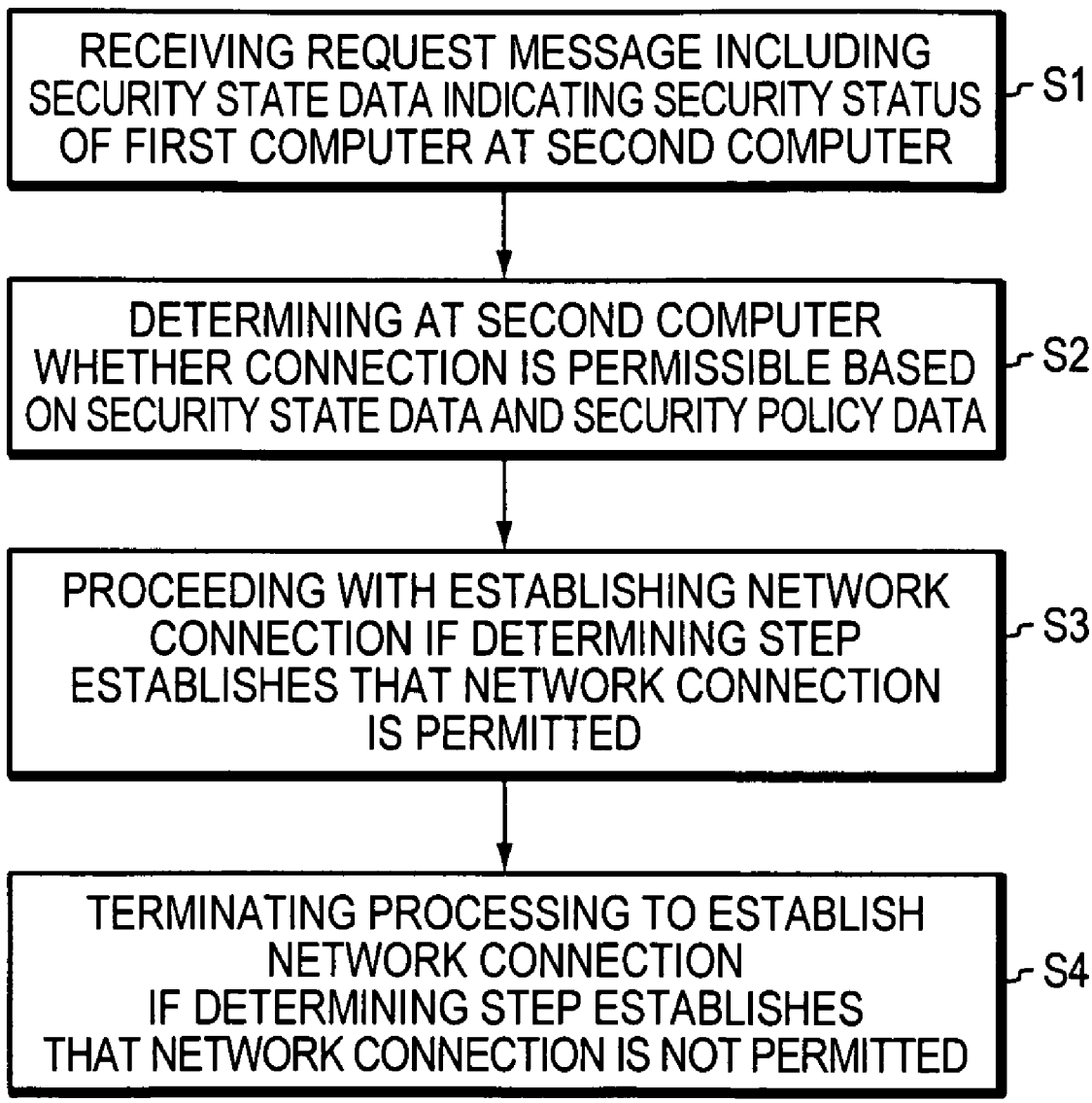
Figure 7:
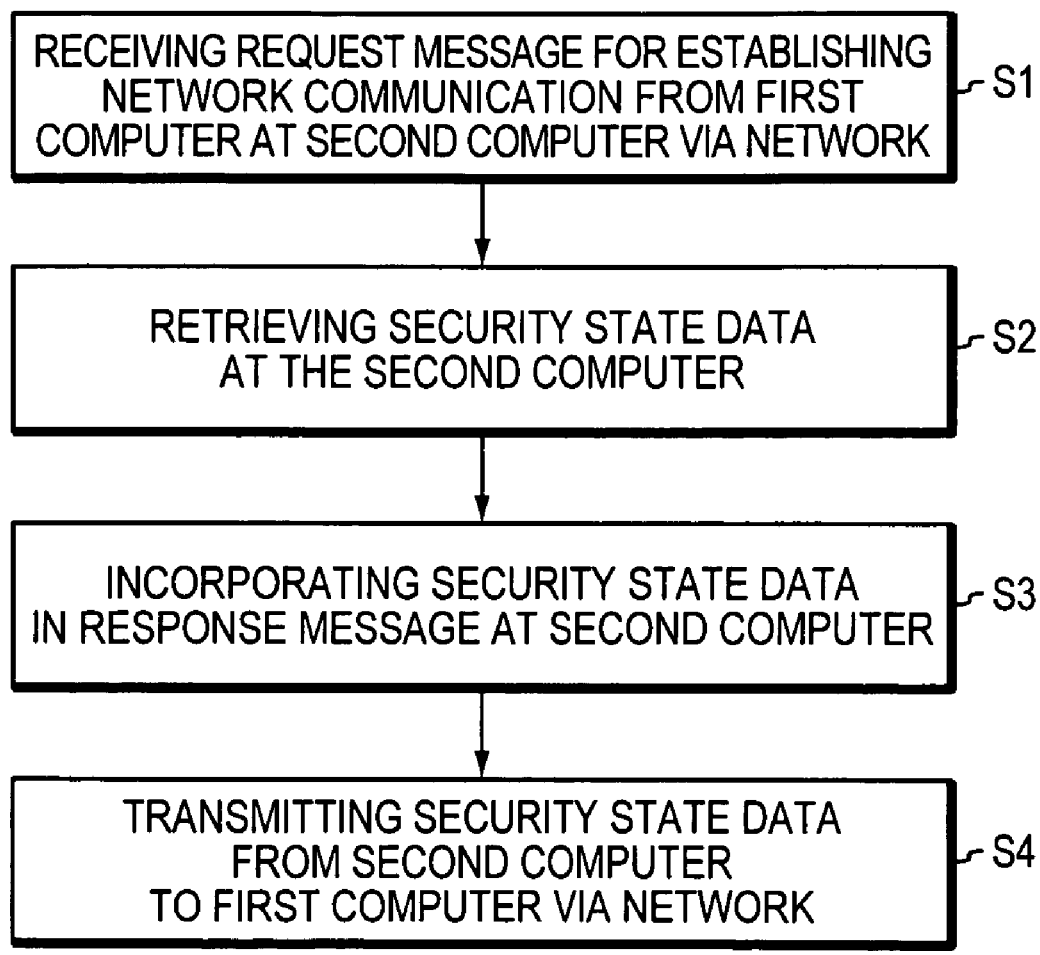
Figure 8:
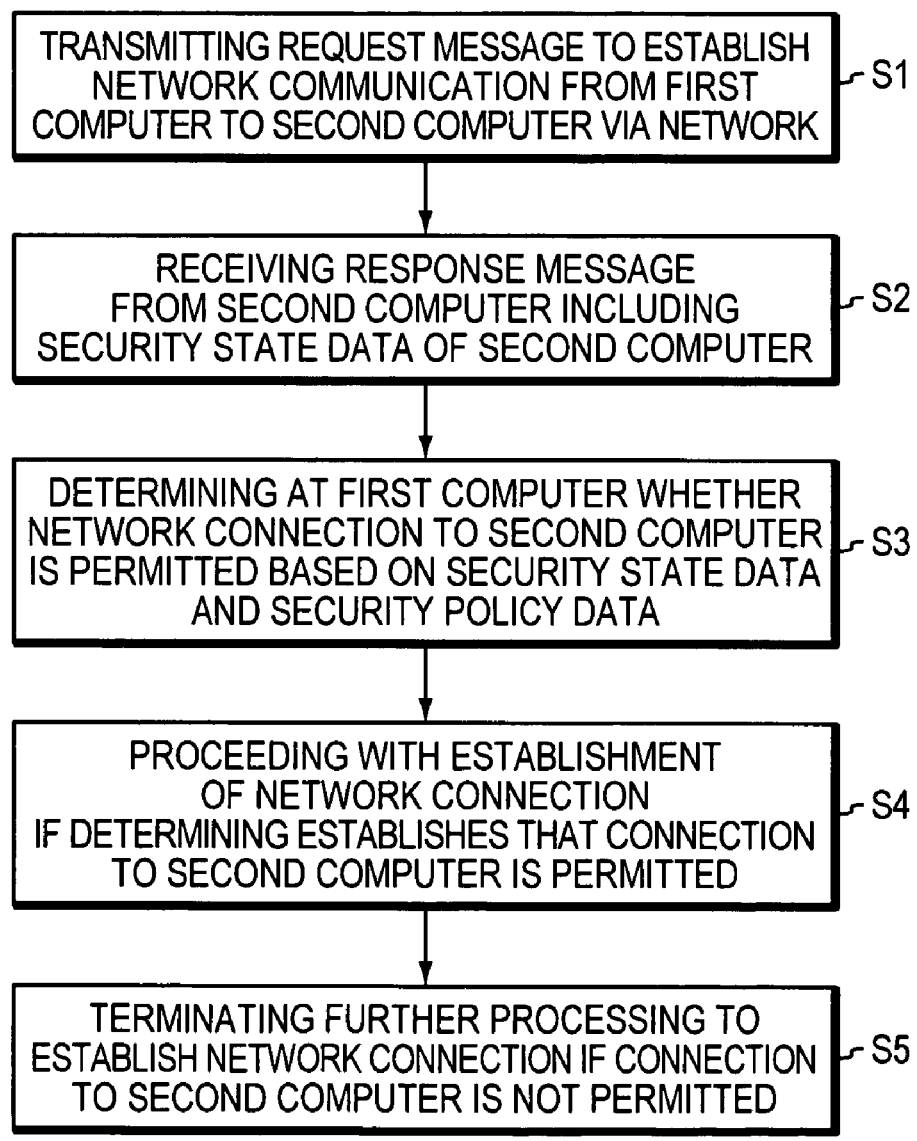

Having thus described the invention in general terms, reference will now be made to the accompanying drawings, which are not necessarily drawn to scale, and wherein:

FIG. 1 is a block diagram of a header structure of a TCP packet to demonstrate how security state data can be incorporated into a field of the TCP packet;

FIG. 2 is a block diagram of protected computers and systems and their relationship to other unprotected computers and systems;

FIGS. 3A and 3B are block diagrams of a protected system in accordance with the present invention;

FIG. 4 is a flow diagram illustrating execution of a security check API on a computer to determine and update its security state data;

FIG. 5 is a flow diagram in accordance with first embodiments of the invention illustrating a method of incorporating security state data in a request message at a first computer before transmission to a second computer via a network;

FIG. 6 is a flow diagram in accordance with the first embodiments of the invention illustrating a method of receiving at a computer a request message from another computer to establish a network connection and determining if such connection is to be permitted by comparing security state data in the request message with security policy data available to the computer;

FIG. 7 is a flow diagram in accordance with second embodiments of the invention illustrating a method of receiving at a computer a request message requesting a network connection and responding to the request by incorporating security state data into a responsive message;

FIG. 8 is a flow diagram in accordance with the second embodiments of the invention performed by a first computer to transmit a request message to establish a network connection with a second computer, receive security state data from the second computer and compare it with its security policy data to determine if a network connection is permitted with the second computer.

DESCRIPTION OF THE PREFERRED EMBODIMENTS

The present inventions now will be described more fully hereinafter with reference to the accompanying drawings, in which some, but not all, embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Definitions

'And/or' means 'one, some, or all' of the things immediately preceding and succeeding this phrase. Thus, 'A, B and/or C' means 'any one, some or all of A, B and C.'

'Computer' can be any device capable of receiving input data, processing that data, and generating output data. The computer can be a personal computer, laptop computer, personal digital assistant (PDA), server, mainframe, minicomputer, or any other computing device. Examples are commercially available from numerous vendors, including Dell® Corporation, Round Rock, Tex.; Hewlett-Packard® Corporation, Palo Alto, Calif., IBM® Corporation, Armonk, N.Y., Sun Microsystems, Inc., Sunnyvale, Calif., and numerous others.

'Input Device' can be a keyboard, keypad, mouse, joystick, pen, stylus or other device used to input data into a computer.

'Memory' or 'computer-readable medium' refers to virtually any element capable of storing data and/or code that can be read by a processor of a computer. "Memory' includes within its meaning one or more transistors capable of storing data, a flip-flop, register, random-access memory (RAM) such as synchronous dynamic access RAM (SDRAM), read-only memory (ROM), flash memory, compact disc (CD), digital video disc (DVD), hard disk drive unit, disk storage unit, magnetic tape, etc. or any other device that can be used to store data.

'Network' is a group of computers and associated devices connected to communicate with one another, and can refer to a local area network (LAN), wide area network (WAN), metropolitan area network (MAN), Ethernet, Fast Ethernet, SONET, the Internet I and II, etc.

'Operating system' enables a processor to communicate with other elements of a computer. The operating system controls allocation and usage of hardware resources such as the memory, processor, and peripheral devices such as input and output devices. The operating system can be one of the systems sold under the marks Windows® CE, Palm OS, DOS, Windows® 95, Windows® 98, Windows® 2000, Windows® NT, Windows® XP, Solaris, OS/2, OS/360, OS/400, iSeries, eSeries, pSeries, zSeries, UNIX, LINUX, and numerous others.

'Output Device' refers to a device such as a monitor, for generating a display of a computer.

'Processor' can be virtually any element capable of processing data, including a microprocessor, microcontroller, programmable gate array, field programmable gate array (FPGA), programmable logic array (PLA), programmable array logic (PAL), etc. The processor can be configured to process data in electromagnetic-form including electrical, optical, electro-optical, or magnetic data, for example.

'(s)' or '(ies)' means one or more of the thing meant by the word immediately preceding the phrase '(s)'. Thus, "computer(s)" means "one or more computers."

Use of TCP Protocol to Include Security State Data

Transport control protocol (TCP) is used extensively in network communications over the Internet. It uses sequenced acknowledgement with packet retransmission if necessary. The transport control protocol (TCP) packet 10 includes standard fields as indicated in FIG. 1, whose functions and use are defined under IETF RFC793 and are well-known to those of ordinary skill in the art. These fields include source port, destination port, sequence number, acknowledgement number, offset, reserved, control bits U, A, P, R, S, F, window, checksum, urgent pointer, option and padding, and data fields. Except for the reserved field which receives no data, these fields are used to store data whose purpose is well-known to those of ordinary skill in the art.

To establish network communication between two computers over a network using TCP, the two computers perform a three-step handshake, sometimes referred to as SYN-SYN-ACK-ACK. More specifically, the computer initiating communication transmits a synchronization (SYN) TCP packet to the computer to which a connection is to be made. The receiving computer responds with a synchronization acknowledgement (SYNACK) TCP packet, and the initiating computer responds to receipt of the SYNACK TCP packet with an acknowledgement (ACK) TCP packet transmitted to the computer responding to the request to open a network connection. If either computer determines in the process that a network connection is not to be made, it can terminate further processing to establish the connection by transmitting a NACK (or "not acknowledged") packet to the other computer. This will cause the receiving computer to terminate further processing to establish the connection.

Of particular interest to this disclosure is security state data 12 which defines the security status of the computer initiating or responding to initiation of network communication. The security state data 12 contains data that indicates the security status of the computer with which it is associated. In FIG. 1, the security state data 12 comprises various flags including 'anti-virus application active (AVA)' data 14, anti-virus application up-to-date (AVU) data 16, firewall application active (FWA) data 18, firewall application up-to-date (FWU) 20, operating system patch(es) active (OSP) 22, operating system patch(es) up-to-date (OSU) data 24. The AVA data 14 indicates if any anti-virus application present on the computer with which the security state data 12 is associated, is active to prevent security attacks by viruses, worms, and the like. The AVA data 14 is generated by the application, and is stored as security state data 12 by a security check API to be described in further detail later in this document. The anti-virus application can be one of many applications, such as VirusScan® software from McAfee Security, Inc., Santa Clara, Calif., Norton Anti-Virus software produced by Symantec Corporation, and numerous other applications. The AVU data 16 indicates whether the anti-virus application is up-to-date. Developers of anti-virus applications frequently provide updates to their applications which can be downloaded and installed by a user from the developer's website via the Internet. A flag or data generated by the anti-virus application indicates whether the user has the latest anti-virus application updates and virus definitions for the anti-virus application, and alerts the user if updates need to be downloaded from the developer's website. The security check API can access this data generated by the anti-virus application and store the same as security state data 12. The FWA data 18 indicates whether the firewall application associated with the computer is present and active. The data indicating whether the firewall application is active is generated and stored by such application, and can be read and stored by the security check API as security state data 12. The FWU data 20 indicates if the firewall application running on the computer is active and up-to-date with any software updates that may be offered by the firewall developer or support service. This data too can be read by the security check API from data stored by the firewall application. The OSP data 22 indicates whether any patch(es) for its operating system have been obtained and installed in the computer, and whether such patch(es) are active to protect the computer. Developers of operating systems (e.g., Microsoft Corporation, Novell Corporation, RedHat Corporation, Sun Microsystems, Inc., etc.) frequently provide patch (es) to close a vulnerability existing in their operating systems soon after they are discovered. Finally, the OSU data 24 indicates whether the operating system patch(es) made available by the operating system developer or other entity are up-to-date to include the latest patch(es). Data indicating whether the operating system has a patch that is active, and whether that patch(es) is up-to-date, is generated and stored by the operating system and can be retrieved and stored by the security check API and stored as security state data 12. Typically, a computer's operating system receives a communication via the Internet that indicates the availability of a patch for installation by the website of the developer of the operating system. The user can operate a web browser to download and install the patch to the computer's operating system to close a security vulnerability in the computer's operating system.

Because in TCP the Urgent Pointer field 26 need not be used to establish a network connection between two computers, the security state data 12 can be inserted into the Urgent Pointer field 26 by the computer initiating opening of a network connection and/or the computer receiving a request to establish a network connection from another computer. This permits the computer receiving the security state data 12 to use it to apply a security policy to determine if communication with the other computer is permitted. Thus, communication with another computer can be granted or refused using the security state data to determine if communication is permitted with that computer given its security status.

In the use of security state data 12 to apply security policy data, various embodiments are possible. The following describes two exemplary embodiments of the invention.

General Description of First Group of Embodiments of Invention

In the first embodiments of the invention, a first computer initiates communication by retrieving and incorporating its security state data 12 in a SYN packet 10. The first computer transmits the SYN packet 10 along with the security state data 12 to the second computer via the network. The second computer receives the SYN packet and determines if connection is permissible using the received security state data and its own security policy data. If the second computer determines that response to the SYN packet to establish a connection is permitted using data indicating its security policy, the second computer responds with a SYNACK packet and optionally includes its own security state data 12 for use by the first computer. Conversely, if the second computer determines that the network connection is not permitted under its security policy, it can respond with a NACK packet to terminate the connection. Alternatively, it can simply not respond to the first computer to avoid revealing any data indicating characteristics of the second computer that can be exploited by a virus or worm (such as the identity of its operating system, etc.) The first computer receives the SYNACK packet, and optionally applies its own security policy data to determine if communication with the second computer is permissible given its security status. If the first computer determines that the network connection is permitted by its security policy data, then it transmits an ACK packet to the second computer in order to complete establishment of the network connection. Conversely, if the first computer determines that the security status of the second computer does not permit the first computer to connect to it under its security policy, the first computer transmits a NACK to the second computer. Alternatively, the first computer can be programmed to simply not respond to the second computer to avoid transmission of any further data that can be used by a virus or worm in the second computer to attack the first computer.

General Description of Second Group of Embodiments of Invention

The first computer initiates communication by transmitting a SYN packet to the second computer via the network. The second computer retrieves its security state data 12 and transmits the same to the first computer in a SYNACK packet. The first computer receives the SYNACK packet and determines if connection is permissible using the received security state data and its security policy data. If the first computer determines that response to the SYNACK packet to establish a connection is permitted under data indicating its security policy, the first computer responds with an ACK packet and optionally includes its own security state data for use by the second computer. Conversely, if the first computer determines that the network connection is not permitted under its security policy data, it can respond with a NACK packet to terminate the connection. Alternatively, it can simply not respond to the second computer to avoid revealing any characteristics of the first computer that can be exploited by a virus or worm. The second computer receives the ACK packet via the network, and optionally applies its own security policy data to determine if communication with the first computer is permitted given its security status. If the second computer determines that the network connection is permitted by its security policy data, then it permits establishment of the connection. Conversely, if the second computer determines that the security status of the first computer does not permit the first computer to connect to it under its security policy, the second computer transmits a message to terminate the connection to the first computer, such as an ABORT or CLOSE message, and disregards further communication from the first computer. Alternatively, the second computer can be programmed to simply not respond to the first computer to avoid transmission of any further data that can be used by a virus or worm in the second computer to attack the first computer.

System and Apparatuses

FIG. 2 shows the general architecture of protected systems 100 in accordance with the invention, and their relationship to unprotected computers. Specifically, the protected system 100 comprises one or more host computers 200, a manager computer 300, and one or more host computer 500 coupled to respective gateway computers 400 via the respective networks 800. The manager computer 300 manages the protected system 100 by distributing a security check API, security state inserter module, security policy enforcer module, and security policy data to the host computers 200 and gateway computers 400 to enable them to become protected. The security check API runs on a computer to determine its security status, such as if the anti-virus and firewall applications are active and up-to-date, and if patch(es) for the operating system are installed and up-to-date. The security state inserter inserts the security state data into a message to be sent to another computer to enable that other computer to determine if the sending computer has a security status that is acceptable to the receiving computer given its security policy. The security policy enforcer is executed by a computer to check its own security policy data as set by the manager computer to determine if security state data from another computer meets the minimum requirements of the security policy required to establish a network connection with that other computer. The security policy data sets the security policy data as to whether anti-virus and/or firewall applications must be active and up-to-date to permit a network connection to that computer. In addition, the security policy data can set requirements for patch(es) to the operating system to be active and up-to-date. The data regarding whether the applications and operating system are active and up-to-date are generated by such applications and operating system. The security check API is programmed to retrieve and store such data as the security state data. The manager computer 300 distributes and manages updates to the security check API, security state inserter, and security policy enforcer to the host computers 200 and gateway 400 which may or may not have activated and up-to-date anti-virus application, firewall application, and patch(es) for its operating system. Because the computers 500 are behind the protected gateway 400 on intranet 800, they need not be protected, although they can be if additional protection is desired. The manager computer 300 thus manages its protected system 100. As shown by dotted continuation lines in FIG. 2 there are potentially numerous other protected systems 100 using the network 600 (which can be the Internet or other public communications network, for example) to communicate with one another. In addition, as shown in FIG. 2, the protected computers of a system 100 can communicate with unprotected host computers 900, gateway computers 1000, or unprotected host computers 1200 on intranets 1100 served by respective gateway computers 1000. Because the packets generated by these unprotected computers will not have security state data in them, protected computers can readily determine that they are communicating with an unprotected computer and apply a default security policy to determine whether the communication should be permitted to continue. This can be done on the basis of the nature of the resource of the protected computer for which access is sought, as well as other factors such as the identity of the system or user requesting such access via the unprotected computer.

An exemplary one of the systems 100 is shown in FIGS. 3A and 3B, and comprises host computers 200 (specifically, 200-1-200-*x*, x being a positive integer), a manager computer 300, gateway computer 400, and host computers 500 (specifically 500-1-500-*y*, y being a positive integer). The host computers 200-1-200-*x* can be connected via network 600 to the manager computer 300. The manager computer 300 can be connected via network 700 to the gateway computer 400. Finally, the gateway computer 400 can be connected via network 800 to the host computers 500-1-500-*y*. The networks 600, 700, 800 can be the same network, or two or more different networks. In the typical case, networks 600, 700 are the same public network, such as the Internet, and the network 800 is an intranet of the computers 500 protected from the Internet by the gateway computer 400. However, this does not exclude the possibility that the networks 600, 700, 800 could be otherwise implemented for an application of the system 100.

Each host computer 200, in general terms, has a processor 202, a memory 204, an input device 206, an output device 208, an interface unit 210, and bus 211 coupling these elements together. Although this is a simplification of the internal configuration of modern computers, at a basic level, it is sufficient to describe that which is necessary for an understanding of the disclosed invention. The processor 202 executes the operating system and applications stored in the memory 204 and retrieves and processes stored data in carrying out execution of the computer code. The input and output devices 206, 208 permit a human user to interact with the computer 200 by providing a user interface. The interface unit 210 can be a network interface card (NIC), Ethernet card, modem, etc. enabling communication with other computers via the network 600.

Similarly, the manager computer 300 comprises a processor 302, memory 304, input device 306, output device 308, and interface unit 310, which are coupled via bus 311. The processor 302 executes the operating system and applications using data stored in the memory 304, and the input and output devices 306, 308 permit a human administrator to interact with the computer 300 by providing a user interface. The interface unit 310 enables communication with the networks 600, 700 (as previously explained, these can be the same and normally are, in many practical applications of the invention, the Internet).

Similarly, the gateway computer 400 comprises processor 402, memory 404, input device 406, output device 408, and interface unit 410, which are coupled via bus 411. The processor 402 executes the operating system and applications using data stored in the memory 404, and the input and output devices 406, 408 permit a human intranet administrator to interact with the computer 400 by providing a user interface. The interface unit 410 enables communication with other computers via the networks 700, 800 (as previously explained, normally, the network 700 is the Internet and the network 800 is an intranet).

The host computers 500 can be configured similarly to host computers 200. However, because these computers are protected by gateway computer 400, it is not necessary that each be provided with the security check application program interface (API) 102, the security state inserter module 104, the security policy enforcer module 106, the security policy data 108, the anti-virus application 114, 414, or the firewall application 116, 416. However, such modules, data, applications, and stack can be provided for such computers 500 if additional security is desired by the intranet users and/or administrator. In addition, the network 800 need not be an Ethernet network or the like supporting the TCP/IP protocol stack 420, and it is thus possible to replace this stack with a module that supports a different protocol for communication on the network 800.

The networks 600, 700, 800 can comprise a network of computers, routers, switches, etc. that are connected to allow packet communications to flow from one computer to another. These networks can be implemented as packet switching networks that are well-known to those of ordinary skill in the art.

The manager computer 300 is responsible for administering the security policy of the overall system 100 for those computers that are protected. To this end, it is provided with a manager application 301, security check API 102, security state inserter 104, security policy enforcer 106, and security policy data 108. The manager application 301 is executed by the processor 302 to enable the human administrator to set security policy data 108 via the input and output devices 306, 308. The security check API 102 can be executed by the processor of a computer in order to update security state data 312 related to anti-virus application, firewall application, and operating system patch(es), according to whether this software is active and up-to-date. The security state inserter 104 retrieves and inserts security state data 112 of a computer into a TCP packet to be transmitted to another computer. The security policy enforcer 106 is executed by a computer to determine if a network connection with the transmitting computer should be permitted to continue given the security data and the data defining the security policy set by the manager computer 300.

If it is determined that an unprotected computer is to be provided with the software or code necessary to convert it into a protected computer, then the manager computer 300 executes its manager application 301, causing it to transmit the computer code modules 102, 104, 106 to the unprotected computer, along with the security policy data 108 set by the system administrator. The receiving computer then loads the modules 102, 104, 106, thereby enabling it to become a protected computer under the security policy set by data 108. Communication can still be permitted by a protected computer with an unprotected computer if the security policy data 108 is set to so allow. A system administrator can use the manager computer 300 to set the security policy data 108 to allow or prohibit certain types of communication between protected and unprotected computers.

In the first embodiment of FIGS. 3A and 3B, assume that computers 200-1 and 200-$x$ are protected. Each will execute respective security check API 102 upon boot-up to interrogate its anti-virus application 114, firewall application 116, and operating system 118, to determine if each is active and up-to-date. Each will also execute the API 102 in the event that a security-related change of any of the applications 114, 116, and operating system 118, is made. Each computer sets the security state data 112, or more specifically, the AVA data 14, AVU data 16, FWA data 18, FWU data 20, OSP data 22, and OSU data 24 according to if each is active or up-to-date. Hence, the security state data 112 can be defined as data with a length of six bits. Such bits can be numbered "0" through "5", and can indicate the logic states of the AVA data 14, AVU data 16, FWA data 18, FWU data 20, OSP data 22, and OSU data 24, respectively. For example, a string of data such as "1 1 1 1 1 1" can be used to indicate that all of data 14, 16, 18, 20, 22, 24, are active and up-to-date, and a string of data "0 0 0 0 0 0" can be used to indicate that none of such data is active and up-to-date. Thus, the bit for each flag can be set if respective data is active or up-to-date, as applies to the particular bit, or reset if such data is not active or not up-to-date, as applicable. The security policy data 108 can be set in a similar way, defined as a six-bit string of data with bits "0" through "5" corresponding to the security policy identified by AVA data 14, AVU data 16, FWA data 18, FWU data 20, OSP data 22, and OSU data 24, respectively. Thus, the data string "1 1 0 0 0 0" means that the anti-virus application of a computer requesting a connection of the computer applying the security policy must be active and up-to-date, but the firewall application need not be active or up-to-date, and the operating system data need not have active patch(es) or patch(es) that are up-to-date. By performing an AND operation on the security policy data and security state data, and comparing the result with the security policy data to determine if the two are the same, the computer can determine if the security state data complies with the security policy data. If the compare operation indicates that the result of the AND operation and the security policy data are different, the data resulting from this comparison indicates the computer requesting connection is not compliant with the enforcing computer's security policy. Conversely, if the result of the AND operation and the security policy data are the same, then the requesting computer's security state is in compliance with the computer enforcing the policy and the connection is permitted. It is normally advisable that the security policy data 108 to be set to require anti-virus application to be active and up-to-date, the firewall application to be active and up-to-date, and the operating system to have active patch(es) that are up-to-date, in order to permit connection by a computer requesting a connection of the computer enforcing the security policy data unless significant reasons dictate otherwise.

When the computer 200-1 initiates a network connection with the computer 200-$x$ via the network 600, it will execute its TCP stack 120-1 in order to create a SYN packet 10-1$a$ of the structure shown in FIG. 1. It further executes the security state inserter 104-1 to retrieve and insert the security state data 112-1 into the SYN packet 10-1$a$ being constructed. Next, it transmits the SYN packet 10-1$a$ over the network 600 to the host computer 200-$x$. Upon receiving this SYN packet, the computer 200-$x$ executes its own security policy enforcer 106-$x$ to compare the received security state data 112-1 with its security policy data 108-$x$. If the determination establishes that the communication is not permitted, more specifically, one or more of the applications 114-$x$, 116-$x$ and operating system 118-$x$, are not active and up-to-date as required by the security policy data 108-$x$, then the host computer 200-$x$ can execute its security policy enforcer 106-$x$ to drop the connection, exposing no data to the requesting host computer 200-1 that can be exploited by a virus or worm therein. Alternatively, the security policy enforcer 106-$x$ can be programmed so as to transmit a NACK message to the host computer 200-1, thereby terminating the connection. The sending of the NACK message does carry some limited risk, however, because some information about the host computer 200-$x$ can be exposed to a virus or worm in the host computer 200-1 if it is sufficiently sophisticated. If the result is that the connection is permitted, then the host computer 200-$x$ can execute its security state inserter 104-$x$ to incorporate its own security state data 112-$x$ into the SYNACK TCP packet 10-$x$, e.g., in the URP field as previously described. The host computer 200-$x$, or more specifically, its processor 202-$x$, then executes its TCP protocol stack 120-$x$ to transmit the SYNACK packet 10-$x$ with its security state data 112-$x$ incorporated therein to the host computer 200-1 via the network 600. In turn, the security policy enforcer 106-1 is executed by the host computer 200-1, causing it to compare the received security state data 112-$x$ with its security policy data 108-1. In this case, if the host computer 200-1 determines that one or more of the applications 114-1, 116-1 are not active and/or up-to-date, and/or the operating system lacks a patch(es) and/or the patch (es) is not active, and such is required by the security policy data 108-1, then the host computer 200-1 terminates the connection. It can do this by simply dropping the connection, or it can transmit a NACK message to stop the connection. This completes discussion of the implementation of the first embodiment of the invention in connection with the system 100 of FIGS. 3A and 3B.

In the second embodiment, assume as before that computers 200-1 and 200-$x$ are each protected. The host computer 200-1 executes its TCP stack 120-$x$ to generate and transmit a TCP SYN packet 10-1$a$ to the host computer 200-$x$. The host computer 200-$x$ responds by creating a SYNACK packet 10-$x$ and executing its security state inserter 104-$x$ to incorporate its security state data 112-$x$ into the SYNACK packet 10-$x$. The host computer 200-$x$ executes its TCP stack 120-$x$ to transmit the SYNACK packet 10-$x$ with its security state data 112-$x$ back to the host computer 200-1 via the network 600. The host computer 200-1 executes its security policy enforcer 106-1 to compare the received security state data 112-$x$ with its security policy data 108-1. If it determines that one or more applications 114-1, 116-1 are not active or up-to-date, or that an operating system patch required by the security policy data 108-1 is missing or not active, then the host computer 200-1 executes the security policy enforcer 106-1 to drop the connection or transmit a NACK to the host computer 200-$x$. Conversely, if the host computer 200-1 determines that the connection is permitted under the security policy data 108-1, then it executes its TCP stack 120-1 to generate an ACK packet 10-1b and inserts its security state data 112-1 therein. It further executes the TCP stack 120-1 to transmit the ACK packet 10-1b and the incorporated security state data 112-1 to the host computer 200-x via the network 600. The host computer 200-x receives the ACK packet 10-1b and compares the received security state data 112-1 and executes its security policy enforcer 106-x to compare it against the security policy data 108-x to determine if the network connection is to be permitted. If the received security state data 112-1 does not comply with the policy established by the security policy data 108-x, then the security policy enforcer 106-x executes its TCP stack 120-x to transmit a NACK message to the host computer 200-1 via the network 600 and disregards further data transmitted by such host computer 200-1 in the terminated session, or simply drops the connection request without responding to the computer 200-1. Conversely, if the host computer 200-x executes its security software and determines that the received security state data 112-1 complies with its security policy data 108-x, then the host computer 200-x permits the network connection to the host computer 200-1 via the network 600.

Those of ordinary skill in the art will appreciate that a network connection under either the first or second embodiment may be established by any of the host computers 200, manager computer 300, and gateway computer 400 and the processing performed by each will be in substance similar to that described above with respect to communications between computers 200-1 and 200-x.

It will be appreciated that the manager computer 300 should rapidly deploy any updates to the computer code modules 102, 104, 106 or the security policy data 108 to all protected computers. Else, considerable difficulty can result if computers are running different versions of these programs or data.

Although all of the computers shown in FIGS. 3A and 3B are assumed to be protected by the computer codes 102, 104, 106 according to security policy data 108, it is possible that one or more computers can be unprotected, such as computers 900, 1000, 1200 of FIG. 2. If so unprotected, a protected computer will communicate with the unprotected computer by applying a default policy for unprotected computers defined by security policy data 108. In this case, the insertion of security state data 112 into a packet by a protected computer will have no impact on the unprotected computer since the field in which the security state data 112 is inserted into the packet is normally ignored by the unprotected computer because it does not have the necessary security policy enforcer 108 to enable it to use this data.

Methods

FIG. 4 is a flow diagram of a method in accordance with the invention. The method can be performed by any of the computers 200, 300, 400, 500 provided with the security check API or code 102. In step S1, the computer is booted up. In step S2, the computer executes the security check API to determine its security state data 112. It can do this by checking its anti-virus application 114 and firewall application 116 to determine if its patch(es) are active and running on the computer, and up-to-date, and operating system 118 to determine if its patch(es) are active and up-to-date. In Step S3 the computer stores the security state data 112. It does this so that this data is available to include in a packet transmitted to establish a network connection with another computer. In step S4 the computer determines if there is a security status update for any of its anti-virus application 114, firewall application 116, and operating system 118. This can be done when the anti-virus application 114 or firewall application 116 is signaled over the Internet by its developer's website to advise of the availability of a new security update designed to improve effectiveness against virus, worms or other security breaches. Alternatively, it may be the result of the computer user downloading and installing a patch from a developer's website of the computer's operating system from its developer's website to block a vulnerability of the operating system to attack, for example. If the determination in step S4 is affirmative, then the flow executed by the computer returns to steps S2 and S3 to determine the updated security state data 112 and to store same in the computer's memory. Conversely, if the result of the determination in step S4 is negative, then the computer re-executes the step S4 periodically or in response to a change in status of the anti-virus application, firewall application and/or operating system in order to determine if the security state data has been updated and thus needs to be stored in the memory of the computer so that it is available for use by the computer to allow other computers to determine if connection to the computer is permitted given its security state data.

FIG. 5 is a method in accordance with the first group of embodiments of incorporating security state data 112 in a message to request a network connection at a first computer for transmission to a second computer. The second computer can then compare its security policy data to the security state data to determine if communication with the first computer is to be permitted. In step S1 of FIG. 5, the first computer retrieves its security state data. Normally, this data will have been previously obtained and stored by the security check API, but it is also possible that it could be determined by the first computer user and/or code operation upon establishing that a network connection is needed. In step S2 the first computer incorporates its security state data into a request message for requesting a network connection with the second computer. In step S3 the first computer transmits the request message including the security state data from the first computer to the second computer via the network.

FIG. 6 is a method in accordance with the first embodiment of receiving a request message (e.g., SYN packet) having security state data and using the security state data to determine if a network connection requested by the message is permitted by the security policy data. It is assumed that before performance of the method of FIG. 6 that a first computer has transmitted the message requesting a network connection and including its security state data to a second computer which performs the method. In Step S1 of FIG. 6 the second computer receives the request message including the security state data of the first computer. In Step S2 the second computer determines if the connection is permissible based on the received security state data and its security policy data. More specifically, the second computer retrieves its own security policy data, compares this data with the first computer's security state data, and determines if the connection is permitted. If the network connection is determined to be permitted by the second computer, then in Step S3 it proceeds with establishing the network connection. For example, this can be done by generating and transmitting a SYNACK packet and transmitting same to the first computer. Conversely, if in Step S4 the second computer determines that the network connection is not permissible, it terminates the processing of the network connection. This can be done by simply dropping the connection to avoid exposing any information regarding the second computer that could be exploited by a virus or worm in the first computer. Alternatively, the second computer can transmit a NACK packet to the first computer to stop the connection from occurring.

FIG. 7 is a method according to a second embodiment of the invention in which a first computer transmits a request message (e.g., SYN packet) for a connection in response to which the second computer incorporates its security state data in a response message for transmission to the first computer. In step S1 of FIG. 7 the second computer receives the message requesting establishment of a network connection with the second computer from the first computer via the network. In Step S2 the second computer retrieves its security state data. This step is normally performed by the security check API upon boot-up and thereafter as activation or deactivation and updates to the anti-virus and firewall applications and operating system occur on the second computer. Alternatively, the step can be performed in response to receiving the request message requesting network connection from the first computer, although this may not be desirable if this action slows responsiveness of the second computer to too great a degree. In Step S3 the second computer incorporates its security state data in a response message for transmission to the first computer. For example, this response message can be a SYNACK packet. In Step S4 the second computer transmits the response message containing its security state data to the first computer via the network. This ends the processing of the second computer performed in the method of FIG. 7.

FIG. 8 is a method in accordance with the second embodiment of the invention in which a first computer receives security state data from a second computer to determine if a network connection with the second computer is permitted under the security policy data in effect at the first computer. In Step S1 the first computer transmits a request message (e.g., a SYN packet) to establish a network connection with the second computer. In Step S2 the first computer receives the response message from the second computer including the security state data of the second computer. For example, the response message can be a SYNACK packet containing the security state data in the Urgent Pointer (URP) field thereof. In Step S3 the first computer determines if network connection to the second computer is permitted using the received security state data and the security policy data stored in its memory. More specifically, it compares the security state data of the second computer with its security policy data, and determines based on this comparison if the network connection is permitted. In Step S4, if the first computer determines that the network connection is permitted, it proceeds with establishment of a network connection to the second computer. This can be done by transmitting an ACK packet, which can include its own security state data for the second computer to determine if its security policy data permits the network connection. In step S5, if the first computer determines that the network connection to the second computer is not permissible under its security policy data, then it can either drop the connection to avoid further exposure of data that could be exploited by a virus or worm in the second computer, or it can transmit a NACK message to the second computer to terminate the connection.

Advantages

Through the use of the disclosed system, apparatuses, methods, and computer-readable media, several advantages are possible. By incorporating security state data of a computer into a message transmitted to another computer in order to request a network connection, the receiving computer can determine the security risk posed by connecting to that computer given its security status. More specifically, the receiving computer can apply its security policy data to determine whether its security policy permits the connection. The spread of a virus, worm or the like is thus greatly reduced or eliminated. In addition, because the security state data can be included in the earliest exchange of messages to establish a connection between two computers, no connection is made so that a virus, worm, or the like has little or no opportunity to infect the computer applying its security policy. Thus, the disclosed system, apparatuses, methods, and computer-readable media offer features and advantages heretofore not possible with previous technologies.

Alternative Embodiments

Many modifications of the system, apparatuses, methods, and computer-readable media disclosed herein are possible without departing from the scope of the invention. For example, fields other than the Urgent Pointer field can be used to store security state data to establish a network connection. It is particularly advantageous if such fields are not used in the handshaking process required to establish a network connection between two computers.

Furthermore, although the packet structure described and used in this disclosure is TCP protocol, the incorporation of security state data can be included in virtually any network communication protocol that has one or more fields that are not used for other purposes in the packets used to initiate network communication, and the embodiments of the invention can be readily modified by those of ordinary skill in this art to accommodate the use of such other field(s). For example, it is possible the security state data, or a part thereof, could be incorporated into the Internet Protocol (IP) header in the IP identification (ID) field, and the disclosed computers, system, methods, and media adapted to accommodate use of such field(s).

It is possible that the protected computers can be operated with or without the security features described herein, i.e., that these features are offered as an option to a computer user. To this end, the computer can be provided with security activation data to indicate if a computer is to operate in protected mode by checking security state data, or conversely, if such computer is to be operated without such protected mode. In this case, the computer checks its security activation data. If active, it will process received security state data by applying its security policy data to determine if a network connection is permitted. Conversely, if inactive, the computer will effectively ignore any security state data that may be included in a received packet.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method comprising the steps of:
(a) receiving from a first computer at a second computer via a network a request message from the first computer to establish a network connection;
(b) retrieving security state data at the second computer;
(c) incorporating the security state data into a response message at the second computer;

(d) transmitting the response message including the security state data from the second computer to the first computer via the network;

(e) receiving the response message including the security state data from the second computer at the first computer via the network;

(f) determining at the first computer if security activation data stored at the first computer indicates that the security state data is to be processed in order to determine if network connection to the second computer is to be permitted; and if the determining in step (f) establishes that the security activation data indicates that the security state data is to be processed, (g) determining at the first computer if the network connection to the second computer is permitted based on security policy data stored in the first computer and the security state data received from the second computer;

(h) proceeding with establishing the network connection if the determining of step (g) establishes that connection to the second computer is permitted; and (i) terminating further processing to establish the network connection if the determining of step (a) establishes that the connection to the second computer is not permitted.

2. The method as claimed in claim 1 wherein the security state data comprises data generated by an anti-virus application running on the second computer.

3. The method as claimed in claim 1 wherein the security state data comprises data generated by a firewall application running on the second computer.

4. The method as claimed in claim 1 wherein the security state data comprises data generated by an operating system running on the second computer.

5. The method as claimed in claim 1 wherein the security state data comprises data received via the Internet from a website of a developer of one or more of an anti-virus application, firewall application, and operating system.

6. The method as claimed in claim 1 wherein the security state data comprises data indicating whether an anti-virus application running on the second computer is active to protect the first computer.

7. The method as claimed in claim 6 wherein the security state data comprises data indicating whether the anti-virus application is up-to-date.

8. The method as claimed in claim 1 wherein the security state data comprises data indicating whether a firewall application is running on the second computer.

9. The method as claimed in claim 8 wherein the security state data comprises data indicating whether the firewall application is up-to-date.

10. The method as claimed in claim 1 wherein the security state data comprises data indicating whether an operating system patch has been installed to close a vulnerability in the operating system running on the second computer.

11. The method as claimed in claim 10 wherein the security state data comprises data indicating whether the operating system patch is up-to-date.

12. The method as claimed in claim 1 wherein the response message is a TCP SYNACK packet.

13. The method as claimed in claim 12 wherein the security state data is incorporated in a field in the header of the TCP SYNACK packet.

14. The method as claimed in claim 13 wherein the field is the urgent pointer field.

15. The method as claimed in claim 1 wherein the security state data is incorporated in the header of the response message.

16. The method as claimed in claim 1 wherein the network is the Internet.

* * * * *